(12) United States Patent
Gray

(10) Patent No.: US 7,168,143 B2
(45) Date of Patent: Jan. 30, 2007

(54) EXTERNAL TUBE DEFORMING EXTRACTION DEVICE

(75) Inventor: Luke G. M. Gray, Waterloo (CA)

(73) Assignee: Babcock & Wilcox Canada Ltd., Cambridge Ontario (CA)

( * ) Notice: Subject to any disclaimer, the term of this patent is extended or adjusted under 35 U.S.C. 154(b) by 110 days.

(21) Appl. No.: 10/880,796

(22) Filed: Jun. 30, 2004

(65) Prior Publication Data
US 2006/0000074 A1  Jan. 5, 2006

(51) Int. Cl.
B23P 19/04 (2006.01)

(52) U.S. Cl. ........................ 29/252; 29/281.1

(58) Field of Classification Search ............... 29/252, 29/281.1; 269/105–115, 289 R, 138, 234
See application file for complete search history.

(56) References Cited

U.S. PATENT DOCUMENTS

| | | | |
|---|---|---|---|
| 1,753,677 A | 4/1930 | Andresen | |
| 2,417,144 A * | 3/1947 | Trimble | 269/41 |
| 3,057,631 A | 10/1962 | LaFleur | |
| 3,104,461 A | 9/1963 | Nieglos | |
| 3,245,247 A | 4/1966 | Valente | |
| 3,507,028 A | 4/1970 | Stellatella | |
| 3,613,489 A | 10/1971 | Randich | |
| 3,791,011 A | 2/1974 | Keys | |
| 3,857,158 A | 12/1974 | Costello | |
| 3,979,816 A | 9/1976 | Green | |
| 4,000,556 A | 1/1977 | Ciminero | |
| 4,053,062 A | 10/1977 | Travis | |
| 4,111,180 A * | 9/1978 | Goodrich | 125/35 |
| 4,180,903 A | 1/1980 | Hannigan, Jr. | |
| 4,231,246 A | 11/1980 | Gorenc et al. | |
| 4,233,730 A * | 11/1980 | Godbe | 29/727 |
| 4,280,274 A | 7/1981 | Filer | |
| 4,283,826 A | 8/1981 | Miller | |
| 4,312,124 A | 1/1982 | Calhoun | |
| 4,355,450 A | 10/1982 | Miller | |
| 4,369,569 A | 1/1983 | Armstrong, Jr. et al. | |
| 4,406,856 A | 9/1983 | Wilkins et al. | |
| 4,471,516 A | 9/1984 | Godbe | |
| 4,586,695 A | 5/1986 | Miller | |
| 4,627,155 A | 12/1986 | Mancabelli | |
| 4,643,247 A | 2/1987 | Tomasula | |
| 4,670,975 A | 6/1987 | Dettinger | |
| 4,776,072 A | 10/1988 | Jaquier | |
| 4,959,899 A | 10/1990 | Martin | |
| 5,168,623 A | 12/1992 | Rabe | |
| 5,276,965 A | 1/1994 | Hahn et al. | |

(Continued)

Primary Examiner—Lee D. Wilson
(74) Attorney, Agent, or Firm—Michael J. Seymour; Eric Marich

(57) ABSTRACT

A tube extraction device which facilitates the removal of a tube from a tube hole in a drum. The tube extraction device comprises a housing which is mounted over an exterior surface of the drum. The housing has an opening which receives a removed part of the tube. A wedge having a slanted face and a bottom edge is slidably mounted in the housing. At least one side thrusting ram and at least one drive down ram are slidably mounted in the housing. The side thrusting ram laterally moves the wedge so that the slanted face indents the tube inwardly, while the drive down ram drives the wedge down into the tube so that the tube collapses in the tube hole.

18 Claims, 2 Drawing Sheets

U.S. PATENT DOCUMENTS

| | | |
|---|---|---|
| 5,621,966 A | 4/1997 | Kvenvold et al. |
| 5,816,568 A * | 10/1998 | Fox .......................... 269/60 |
| 5,826,334 A | 10/1998 | Weeks et al. |
| 5,893,209 A | 4/1999 | Weeks et al. |
| 5,974,642 A | 11/1999 | Weeks et al. |
| 6,079,704 A * | 6/2000 | Buck ......................... 269/242 |
| 6,182,354 B1 | 2/2001 | Weeks |
| 6,205,632 B1 | 3/2001 | Weeks et al. |
| 6,209,181 B1 | 4/2001 | Weeks |
| 6,216,326 B1 | 4/2001 | Ritter et al. |
| 6,430,790 B1 | 8/2002 | Haycook |
| 2006/0000074 A1 * | 1/2006 | Gray ......................... 029/252 |

* cited by examiner

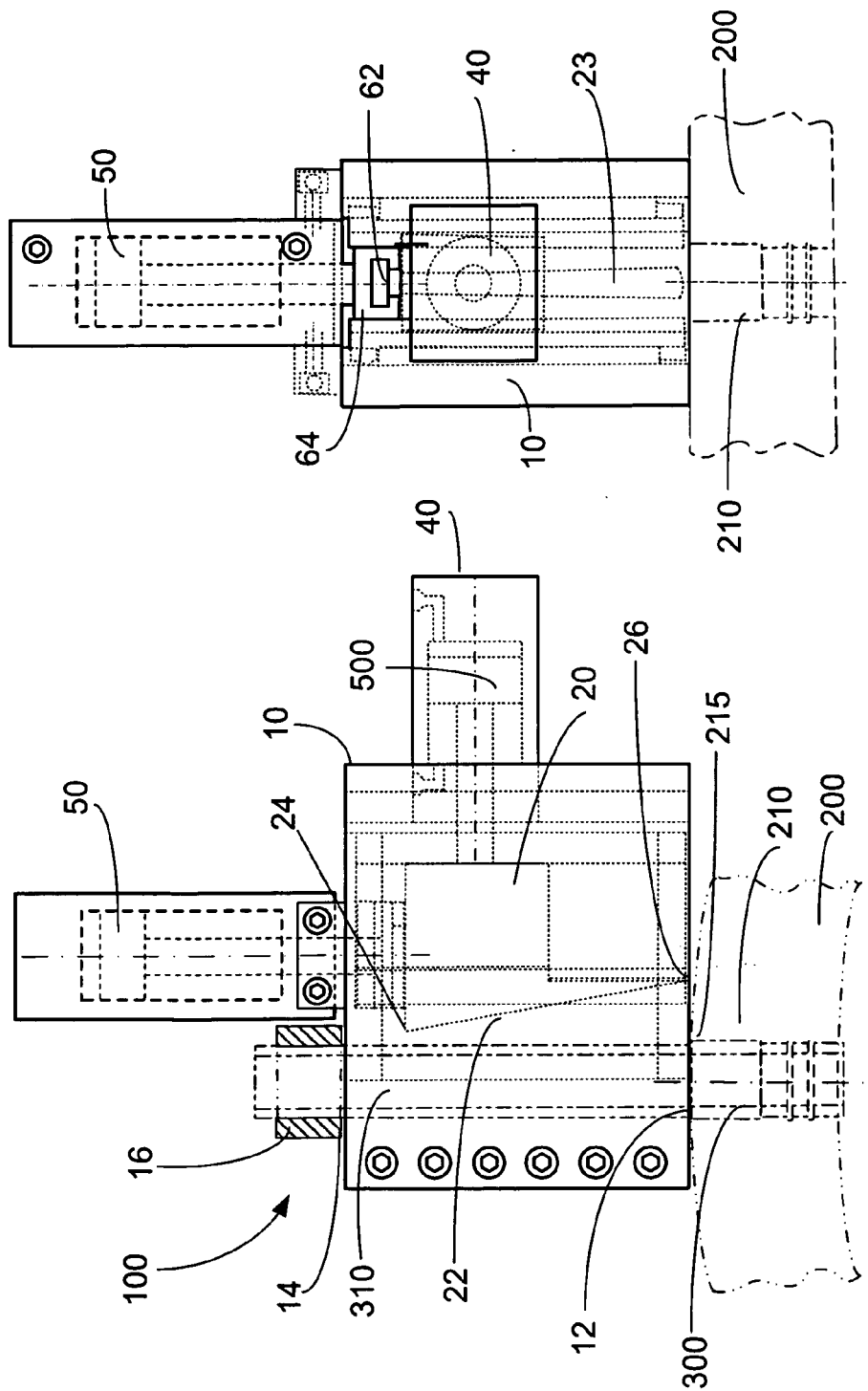

EXTERNAL TUBE DEFORMING EXTRACTION DEVICE

FIELD AND BACKGROUND OF INVENTION

The present invention relates generally to the field of tube extracting devices, and more particularly to an improved tube extracting device for facilitating the removal of tubes from different types of structures, such as boilers, condensers, evaporators, and the like.

A typical condenser comprises a pair of parallel tube sheets, a plurality of baffle plates, and a plurality of heat exchanger tubes. The tube sheets are located at the ends of the condenser. The baffle plates are positioned between the tube sheets and generally parallel thereto. The heat exchanger tubes extend between the tube sheets and through the baffle plates and are supported by the tube sheets. The tube sheets and baffle plates have a series of aligned holes formed therein, and the heat exchanger tubes are inserted through these holes and then expanded in the areas of the tube sheets into fluid-tight pressure contact therewith.

Because of malfunctions or normal preventive maintenance, it may be necessary to remove one or all of the tubes from the structure. This is generally accomplished by first relieving the pressure forces between the tubes and the tube sheets and then longitudinally pulling the tubes through the baffle plates and the tube sheets. Various types of devices are used to initially relieve or break the secured connection between the tubes and tube sheets, and then another apparatus is used to withdraw the tubes from the structure.

In the refurbishing of a water-tube boiler and the replacing of the tubes thereof, the tubes are conventionally removed by the use of an air hammer or the like, chipping away at the tube connection to the drum, to physically force the tube from the associated opening in the boiler drum. These methods have often resulted in damage to the drum and the opening through which the tube stub section projected.

Another method often used for removing tubing from structures is by use of a cutting torch. This is particularly common in the case of large boilers using heavy walled tubing on the order of three inches in diameter. Errors in use of the cutting torch can, of course, damage the tube sheet requiring expensive refinishing and repair work.

Prior art believed to be relevant to the present invention includes U.S. Pat. No. 4,233,730 issued to Godbe, U.S. Pat. No. 4,231,246 to issued Gorenc et al., and U.S. Pat. No. 4,180,903 issued to Hannigan, Jr., as well as, U.S. Pat. No. 2,507,201 issued to Evans, U.S. Pat. No. 2,744,429 issued to Seely and U.S. Pat. No. 3,245,247 issued to Valente.

The Godbe patent discloses a crimping tool having a hydraulic-driven ram which drives a wedge into the outside wall of the tube to crimp the tube. The crimping operation breaks the bond between the tube and tube sheet and allows the tube to be pushed from the hole.

A crimping tool for crimping a boiler tube to facilitate its removal is disclosed in the Gorenc patent.

The Hannigan, Jr. teaches a hydraulic-driven apparatus having a plurality of arms with gripping fingers for engaging and crimping the tube.

The Evans patent discloses a one-piece cutter or plow-type tool for slitting the tubes from the outside of the tube sheet to break the bond between the tube and the tube sheet.

The Seely patent teaches a particular type of tube crimper used in reducing the cross-section of a capillary tube to provide a precise flow resistance.

The Valente patent teaches a complicated device for pointing the end of tubing so that the tubing may be inserted into a drawing die.

There is a need for a simpler device for facilitating the removal of tubing, especially heavy-walled tubing from drums and/or tube sheets without damaging the drum and/or tube sheet bonding surfaces.

SUMMARY OF INVENTION

It is an object of the present invention to provide a novel device for breaking the seal between a tube and a hole in a drum or tube sheet.

It is a further object of the invention to provide a simplified device for facilitating the removal of tubes from a drum or tube sheet without damaging the tube sheet bonding surfaces.

Accordingly, an object of the invention is to provide a tube extraction device which facilitates the removal of a tube from a tube hole in a drum. The device comprises a housing which is mounted over an exterior surface of the drum. The housing has an opening which receives a part of the tube. The device has a wedge which is slidably mounted in the housing. The wedge has a slanted face and a bottom edge. A thrusting ram is slidably mounted in the housing. The side thrusting ram laterally moves the wedge so that the slanted face indents the tube inwardly. A drive down ram is slidably mounted in the housing. The drive down ram drives the wedge down into the zone between the tube outside wall and the tube hole so that the tube collapses into the tubes hole.

It will be seen that use of the device is very rapid and removal of a tube from its secured connection in the boiler drum opening is materially facilitated, thereby materially reducing the costs involved in retubing a boiler or replacing a tube. The tool is light and portable enough so that a single workman utilizing the tool can readily and rapidly accomplish the job of removing the boiler tubes from a boiler. In the past, such a retubing operation normally required several workmen.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a front elevational view of the external tube extracting device of the invention;

FIG. 2 is a side elevational view of the external tube extracting device of the invention;

DESCRIPTION OF THE PREFERRED EMBODIMENTS

Figure 3:
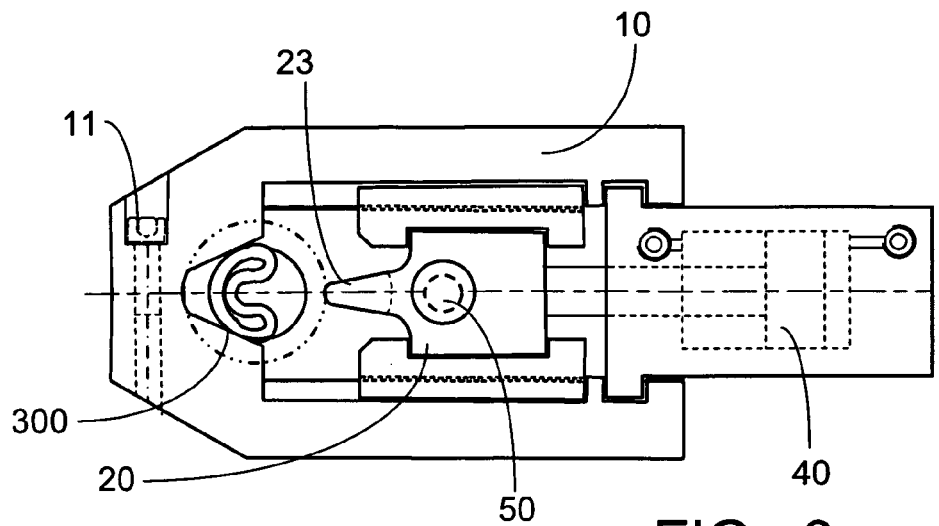
FIG. 3 is a top view of the external tube extracting device of the invention.

Referring now to the drawings, in which like reference numerals are used to refer to the same or similar elements, FIG. 1 shows a side view of the tube extracting device 100. The device has a housing 10 preferably comprised of two parts connected by typical fasteners, such as bolts 11. The housing 10 is supported on an external surface of a drum 200 of a typical boiler, heat exchanger or the like. The drum 200 houses conventional tube(s) 300 in tube holes 210. The tubes 300 are typically expanded into the tube holes 210 thereby forming a joint 215 between the tube 300 and the tube hole 210.

A tube stub 310 extends out of the tube hole 210. The housing 10 has a bottom opening 12 and a top opening 14 which receive the tube stub 310. The tube stub 310 exits the housing 10 from the top opening 14.

A wedge 20 is slidably mounted in the housing 10. The wedge 20 has a face 22 adjacent the portion of the tube stub 310. The face 22 of the wedge 20 preferably has a curved contour 23 as illustrated in FIG. 3. The face 22 has a top edge 24 which is closest to the tube and a bottom edge 26 which is farthest from the tube 300. Thus, the face 22 of the wedge 20 slants downward away from the tube 300. The bottom edge 26 is preferably round.

A side thrusting ram 40 is slidably mounted in the housing 10 preferably behind the wedge 20. The side thrusting ram 40 is connected to the wedge 20 by conventional means. The side thrusting ram 40 is a device well-known in the prior art. For example, the side thrusting ram includes control valves (not shown), spring return (not shown), a piston 500 (shown hidden) and a cylinder, which are all conventional parts of a ram. The side thrusting ram 40 is preferably coupled to a typical hydraulic pump (not shown) which powers the side thrusting ram 40. The hydraulic pump provides pressurized hydraulic fluid to the cylinder and causes an outward extension of the side thrusting ram 40. The spring may automatically return the side thrusting ram 40 inwardly back to its starting position upon shutting off the flow of hydraulic fluid to the power unit via the control valve.

A conventional drive down ram 50 is also slidably mounted in the housing 10 preferably above the wedge 20. The drive down ram 50 is connected to the wedge 20 by means well-known in the prior art. The drive down ram 50, preferably hydraulically powered, drives the bottom edge 26 of the wedge 20 into the indented tube whereby the tube 300 collapses into the tube hole. Tube 300, as collapsed, is then easily removed from the hole by conventional extracting means. When the drive down ram 50 is in operation, the side thrusting ram 40 moves downward or upward along with the wedge 20.

A guide means maintains the wedge 20 in operational alignment with the drive down ram 50. The guide means generally comprises a key and carriage assembly 60. As shown in FIG. 2, a key 62, preferably a T-shaped member, is connected to the top of the wedge 20. A carriage 64, preferably a C-shaped member, is connected to the bottom end of the drive down ram 50. The key 62 slidably engages the carriage 64 to connect the drive down ram 50 to the wedge 20 and allows the wedge 20 to move laterally with respect to the tube hole 210.

Operation of the tube extracting device 100 for removing a tube from anchored relationship to a boiler drum is preferably as follows. In the use of the present device 100, the device 100 is positioned down over the tube stub 310 such that the tube stub 310 may project through the housing 10. Thereupon, the control valve for the power means is actuated to apply pressurized fluid via hose (not shown) to the cylinder, causing extension of the side thrust ram 40, and movement of the wedge 20 into engagement with the tube stub 310.

The slide thrust ram 40 laterally drives the wedge 20 into the tube stub 310. As illustrated in FIG. 2, the face 22 of the wedge 20 applies a force to the wall of the tube stub 310, indenting the tube along an area running generally lengthwise thereof. The wedge 20 moves into the tube stub 310 to a point where the bottom edge 26 is above the joint 215 formed between the tube 300 and the tube hole 210. The face 22 of the wedge 20 applies a force to the tube stub 310, running vertically lengthwise along the tube stub 310, causing inward crimping lengthwise along tube stub 310 as shown for instance in FIG. 3. This inward crimping deforms the periphery of the tube stub 310 section inwardly, pulling the tube 300 away from the inside wall of the tube hole 210 from its attached or secured condition in the boiler drum 200. Thus, the side thrust ram 40 creates a gap between the tube 300 and the inside wall of the tube hole 210. When the bottom edge 26 of the wedge 20 is over such gap, the control valve shuts supply of pressurized fluid to the side thrust ram 40 and, in turn, supplies pressurized fluid to the drive down ram 50. The drive down ram 50 drives the wedge 20 lengthwise down the tube stub 310 whereupon it collapses tube 300 downwardly into the interior of the tube hole 210. Tube 300, as collapsed, can then be readily removed through the tube hole 210 in the drum.

The device 100 will collapse the tube 300 such that the tube 300 will readily fall out of the tube hole 210 upon retraction of the device 100. Depending on the thickness of the tube 300, diameter of the tube hole 210 or whether there are ring grooves into which the tube 300 had been originally expanded, the collapsed tube 300 can attach to the wedge 20 and be removed upon retraction of the wedge 20 from the tube hole 210.

In a preferred embodiment, a keeper plate 16 is secured to the portion of the tube stub 310 which exits the housing 10. The keeper plate 16 is secured to the tube stub 310 by conventional methods such as welding or clamping. The wedge 20 creates a reactive force when it strikes the tube stub 310 which tends to move the device 100 away from the drum 200. The keeper plate 16 stabilizes the device 100 and prevents the device 100 from moving away from the drum 200.

Figure 4:
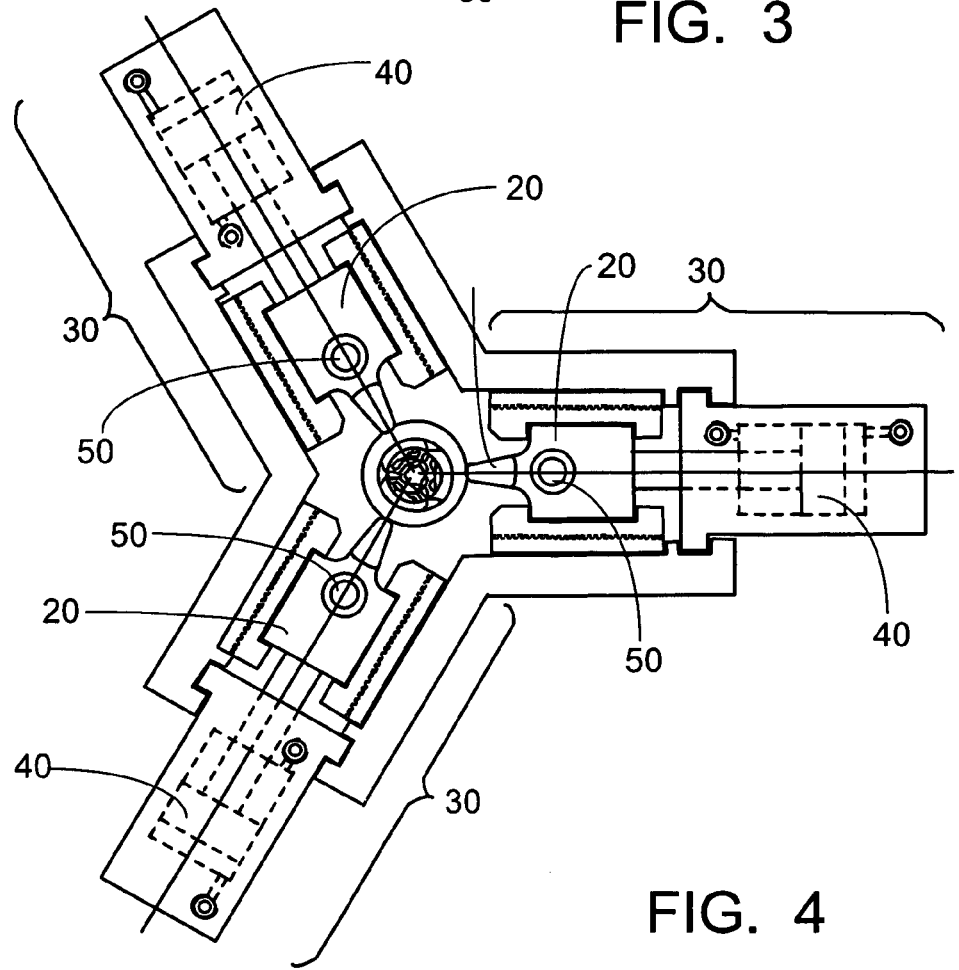
FIG. 4 is a top view of the external tube extracting device of the invention having multiple ram assemblies.

In another embodiment of the present invention, as shown in FIG. 4, the tube extracting device 100 comprises a plurality of ram assemblies 30 each having a wedge 20, a side thrust ram 40, and a drive down ram 50. This embodiment operates in the following manner. The side thrust ram 40 of the first ram assembly 30 laterally moves the wedge 20 into the tube stub 310, followed in sequence by the side thrust rams 40 of the remaining ram assemblies 30. Therefore, the tube stub 310 is indented at multiple angles by the wedges 20 of the ram assemblies 30. The drive down ram 50 of the first ram assembly 30 drives the wedge 20 into the tube stub 310. The drive down rams 50 and wedges 20 of the remaining ram assemblies 30 follow in sequence. The drive down rams 50 collapses the tube 300 into the tube hole 210.

In yet another embodiment of the present invention, the tube extracting device 100 comprising a plurality of ram assemblies 30. In this embodiment each of the side thrust ram 40 of the two or more ram assembly 30 concurrently indent the tube stub 310. The drive down ram 50 of each of the two or more ram assemblies 30 then concurrently drive wedge 20 of the two or more ram assemblies down tube stub 310. The drive down ram 50 of the two or more ram assemblies 30 concurrently collapses the tube 300 into the tube hole 210.

While a specific embodiment of the invention has been shown and described in detail to illustrate the application of the principles of the invention, it will be understood that the invention may be embodied otherwise without departing from such principles.

I claim:

1. A tube extraction device for removing a tube from a tube hole in a drum, the tube extraction device comprising:
   a housing mounted over an exterior surface of the drum, the housing having an opening for receiving a part of the tube;
   a wedge having a slanted face and a bottom protruding edge, the wedge being slidably mounted in the housing;
   at least one side thrusting ram slidably mounted in the housing, the side thrusting ram configured to laterally move the wedge so that the slanted face indents the tube inwardly; and
   at least one drive down ram slidably mounted in the housing, the drive down ram configured to drive the bottom protruding edge down in between the indented tube and tube hole so that the tube collapses in the tube hole.

2. The tube extraction device for removing a tube from a tube hole in a drum as claimed in claim 1, further comprising a means for aligning the wedge with the drive down ram.

3. The tube extraction device for removing a tube from a tube hole in a drum as claimed in claim 2, wherein the means for aligning comprises a key that extends upward from a top part of the wedge and a carriage with a groove connected to the drive down ram so that the key slidably engages the groove.

4. The tube extraction device for removing a tube from a tube hole in a drum as claimed in claim 1, wherein the front face of the wedge is downwardly slanted away from the tube.

5. The tube extraction device for removing a tube from a tube hole in a drum as claimed in claim 1, wherein the side thrusting ram laterally moves the wedge to a point where the bottom protruding edge of the wedge is over a gap between the tube and the tube hole.

6. The tube extraction device for removing a tube from a tube hole in a drum as claimed in claim 1, wherein the slanted face of the wedge has a curved contour.

7. The tube extraction device for removing a tube from a tube hole in a drum as claimed in claim 1, wherein the bottom protruding edge of the wedge is round.

8. The tube extraction device for removing a tube from a tube hole in a drum as claimed in claim 1, further comprising a means for stabilizing the device.

9. The tube extraction device for removing a tube from a tube hole in a drum as claimed in claim 8, wherein the means for stabilizing comprises a plate welded to a part of the tube which extends out of the housing.

10. The tube extraction device for removing a tube from a tube hole in a drum as claimed in claim 1, wherein the housing comprises two parts which are connected by fasteners.

11. The tube extraction device for removing a tube from a tube hole in a drum as claimed in claim 1, wherein the side thrusting ram is mounted behind the wedge and the drive down ram is mounted above the wedge.

12. A tube extraction device for removing a tube from a tube hole in a drum, the tube extraction device comprising:
    a housing mounted over an exterior surface of the drum;
    an opening for receiving a part of the tube;
    a wedge having a downwardly slanted face and a bottom protruding edge;
    at least one side thrusting ram slidably mounted in the housing, the side thrusting ram configured to laterally move the wedge to a point where the bottom protruding edge of the wedge is over a gap between the tube and the tube hole; and
    at least one drive down ram slidably mounted in the housing, the drive down ram configured to drive the bottom protruding edge down in between the tube and tube hole so that the tube collapses in the tube hole.

13. The tube extraction device for removing a tube from a tube hole in a drum as claimed in claim 12, wherein the front face of the wedge is downwardly slanted away from the tube.

14. The tube extraction device for removing a tube from a tube hole in a drum as claimed in claim 12, wherein the side thrusting ram laterally moves the wedge to a point where the bottom protruding edge of the wedge is over a joint between the tube and the tube hole.

15. The tube extraction device for removing a tube from a tube hole in a drum as claimed in claim 12, further comprising a means for stabilizing the device.

16. A tube extraction device for removing a tube from a tube hole in a drum, the tube extraction device comprising:
    a plurality of ram assemblies positioned around the tube, each ram assembly comprising, a housing mounted over an exterior surface of the drum;
    an opening for receiving a part of the tube; a wedge having a slanted face and a bottom protruding edge;
    a side thrusting ram slidably mounted in the housing, the side thrusting ram configured to laterally move the wedge so that the slanted face indents the tube inwardly; and
    a drive down ram slidably mounted in the housing, the drive down ram configured to drive the bottom protruding edge downward in between the indented tube and tube hole so that the tube collapses in the tube hole.

17. A tube extraction device for removing a tube from a tube hole in a drum as claimed in claim 16, wherein the ram assemblies alternatively work on the tube so that each of the side thrusting rams laterally moves the wedge in sequence and then each of the drive down rams alternatively drives the wedge downward in the tube in sequence.

18. A tube extraction device for removing a tube from a tube hole in a drum as claimed in claim 16, wherein the ram assemblies concurrently work on the tube so that each of the side thrusting rams laterally moves the corresponding wedge concurrently and then each of the drive down rams concurrently drives the corresponding wedge downward in the tube.

* * * * *